United States Patent
van Wageningen

(10) Patent No.: US 7,421,522 B1
(45) Date of Patent: Sep. 2, 2008

(54) TECHNIQUES FOR TRANSMITTING AND RECEIVING SPI4.2 STATUS SIGNALS USING A HARD INTELLECTUAL PROPERTY BLOCK

(75) Inventor: Darren van Wageningen, Kanta (CA)

(73) Assignee: Altera Corporation, San Jose, CA (US)

( * ) Notice: Subject to any disclaimer, the term of this patent is extended or adjusted under 35 U.S.C. 154(b) by 621 days.

(21) Appl. No.: 11/001,745

(22) Filed: Dec. 1, 2004

(51) Int. Cl.
*G06F 3/00* (2006.01)
*G06F 5/00* (2006.01)

(52) U.S. Cl. .......................... 710/52; 710/19; 710/310; 710/30; 709/234

(58) Field of Classification Search ............. 710/15–19, 710/22, 30–35, 52–61, 305–317; 709/234–235
See application file for complete search history.

(56) References Cited

U.S. PATENT DOCUMENTS

| | | | |
|---|---|---|---|
| 4,766,536 A * | 8/1988 | Wilson et al. ............... | 710/121 |
| 5,521,918 A * | 5/1996 | Kim ........................... | 370/428 |
| 5,768,560 A * | 6/1998 | Lieberman et al. .......... | 711/167 |
| 5,825,202 A | 10/1998 | Tavana et al. | |
| 5,874,834 A | 2/1999 | New | |
| 6,091,262 A | 7/2000 | New | |
| 6,094,065 A | 7/2000 | Tavana et al. | |
| 6,242,945 B1 | 6/2001 | New | |
| 6,324,596 B1 * | 11/2001 | Houg ......................... | 710/19 |
| 6,363,211 B1 * | 3/2002 | Kanota et al. ................ | 386/96 |
| 6,490,707 B1 | 12/2002 | Baxter | |
| 6,515,509 B1 | 2/2003 | Baxter | |
| 6,526,563 B1 | 2/2003 | Baxter | |
| 6,982,989 B2 * | 1/2006 | Park et al. ................... | 370/471 |

OTHER PUBLICATIONS

"Atlantic Interface," Altera Functional Specification 13, version 3.0, Altera Corporation San Jose, CA (Jun. 2002).
"FPGAs & FPSCs from Lattice: ORSPI4," product information from http://www.latticesemi.com, Lattice Semiconductor Corporation Hillsboro, OR (2003).
"ORCA® ORSPI4 Dual SPI4 Interface and High Speed Serdes FPSC," product information Lattice Semiconductor Corporation Hillsboro, OR (2004).
System Packet Interface Level 4 (SPI-4) Phase 2: OC-192 System Interface for Physical and Link Layer Devices, Optical Internetworking Forum Implementation Agreement : OIF-SPI4-02.0 (Jan. 2001).

* cited by examiner

*Primary Examiner*—Christopher Shin
(74) *Attorney, Agent, or Firm*—Townsend and Townsend and Crew LLP

(57) ABSTRACT

Techniques for transmitting and receiving FIFO status signals on a hard intellectual property (HIP) block of a programmable logic integrated circuit are provided. The FIFO status signals are demultiplexed after being received in the HIP block and then stored in a per port context. The FIFO status signals are retrieved from a storage block in a per port context and transmitted out of the HIP block through a multiplexer. The demultiplexing and multiplexing reduces the number of input and output ports that are needed to transmit the status signals into and out of the HIP block, yet providing the necessary status throughput for a full-rate SPI4.2 status channel implementation.

20 Claims, 4 Drawing Sheets

TECHNIQUES FOR TRANSMITTING AND RECEIVING SPI4.2 STATUS SIGNALS USING A HARD INTELLECTUAL PROPERTY BLOCK

BACKGROUND OF THE INVENTION

The present invention relates to techniques for transmitting and receiving SPI4.2 status signals using a hard intellectual property (HIP) block, and more particularly, to techniques for reducing the number of input and output ports required to receive and transmit SPI4.2 status signals on a HIP block.

The convergence of systems used in LAN, WAN, MAN, and SAN segments require new, interoperable communications technologies. Modular equipment must have flexible architectures that can support multiple protocols, including Ethernet for the LAN, SONET/SDH for the MAN/WAN, and Fiber Channel for the SAN.

System Packet Interface Level 4, Phase 2 (SPI4.2) is an electrical interface specification for complex communications systems that allows packet and cell transfer between a physical layer device and a link layer device. SPI4.2 allows communications systems to transmit multiple communications protocols using variable, high speed, data rates of up to 10 Giga bytes per second (Gbps), including Packet over SONET/SDH (POS), OC-192, Ethernet, Fast Ethernet, Gigabit Ethernet, 10 GbE, and 10G SAN.

The SPI4-2 interface specification stipulates 16 bit wide transmitter and receiver data paths. The SPI4-2 interface specification also stipulates 2 bit wide FIFO status information is sent and received separately from the corresponding data path. The status information can be sent/received at either ⅛th of the SPI4.2 data rate, or at the SPI4.2 data rate (hereby known as 'full rate'). A SPI4.2 system contains a transmitter data interface and a receiver data interface. The FIFO status information is transmitted separately from the corresponding paths that are used to transmit data. By taking the FIFO status information out-of-band, it is possible to decouple the transmit and receive interfaces so that each operates independently of the other.

As data comes in and out of the FIFO, FIFO status information is relayed to the interface. The FIFO status information indicates how much more data a first-in-first-out (FIFO) buffer associated with an input port can store. The FIFO status of each port/calendar slot is encoded in a 2-bit data structure. The 2-bit data structure indicates one of three status values (satisfied, hungry, or starving) with respect to a port's FIFO. A FIFO status value associated with a port indicates how much data can be transmitted to that port. The FIFO status values are sent to a data transmitter and processed in a calendar portion of a FIFO status state machine.

The FIFO status information is decoded using the calendar portion of a FIFO status state machine associated with the transmitter. In response, the transmitter transmits an appropriate amount of data to the receiving port.

Programmable logic devices (PLDs) are a type of programmable logic integrated circuit. Programmable logic integrated circuits can be configured to perform a variety of logical user functions. Programmable logic integrated circuits also include field programmable gate arrays (FPGAs), programmable logic arrays, configurable logic arrays, etc. Many of today's programmable logic integrated circuits (ICs) have on-chip non-programmable application specific integrated circuit (ASIC) blocks that are referred to as hard intellectual property (HIP) blocks.

Many of today's applications for communications systems require programmable logic integrated circuits, because PLDs and FPGAs provide user design flexibility that is not provided by application specific integrated circuits (ASICs). For example, it may not make economic sense to design and mass produce an ASIC for a low volume communications system. SPI4.2 transmitter and receiver interfaces can be implemented in programmable logic circuits. However, a comparable programmable logic implementation uses more than 2× amounts of logic gates, and at least 2× more time to process the data (system latency).

A complete SPI4.2 HIP implementation features a FIFO status interface for sending and receiving SPI4.2 FIFO status information. Therefore, it would be desirable to provide a SPI4.2 status interface in a HIP block on a programmable logic IC that saves programmable logic resources, uses as few HIP I/O resources as possible, while providing adequate status transfer throughput to keep up with a full-rate SPI4.2 status channel implementation.

BRIEF SUMMARY OF THE INVENTION

The present invention provides techniques for transmitting and receiving FIFO status signals to and from a hard intellectual property (HIP) SPI4.2 block. In one embodiment, FIFO status signals are demultiplexed after being received in the HIP block and then stored in a per port/calendar slot context. In another embodiment, FIFO status signals are retrieved in a per port/calendar slot context and multiplexed before being transmitted out of the HIP block. The multiplexing and demultiplexing reduces the number of input and output ports that are needed to transmit the FIFO status signals into and out of the SPI4.2 HIP block, yet still providing the necessary status throughput even for a full-rate SPI4.2 status channel implementation.

Other objects, features, and advantages of the present invention will become apparent upon consideration of the following detailed description and the accompanying drawings, in which like reference designations represent like features throughout the figures.

DETAILED DESCRIPTION OF THE INVENTION

The techniques of the present invention provide a system for relaying FIFO status information to the user extracted from a SPI4.2 status channel from a SPI4.2 HIP block. The techniques of the present invention also provide a system for receiving FIFO status information from the user to be processed in a SPI4.2 HIP block before transmission on the SPI4.2 status channel. Implementing a SPI4.2 interface on an application specific HIP block substantially reduces the amount wires and logic circuits needed to implement the various SPI4.2 functions. Also, a SPI4.2 HIP block of the present invention requires less input and output ports to transmit and receive FIFO status signals.

As discussed above, a SPI4.2 compatible interface can support a maximum of 256 ports. However, it would be cumbersome to provide 512 I/O ports (256*2 status bits) on a HIP block in order to support FIFO status information for 256 ports. HIP blocks typically have a limited number of input and output ports that are used to interface with the rest of the FPGA.

It is also desirable to ensure that status updates can be provided in a timely fashion to and from the SPI4.2HIP block. To have a single 2-bit status input or output with a qualifying address will not maintain the status data throughput required for a SPI4.2 full rate status channel implementation.

The present invention provides techniques for substantially reducing the number of input and output ports that are needed to receive and to transmit FIFO status information on a HIP block. The present invention also reduces the system latency time required to transmit FIFO status information to and from a SPI4.2HIP block, providing adequate status data throughput for a full rate status channel implementation.

Figure 1:
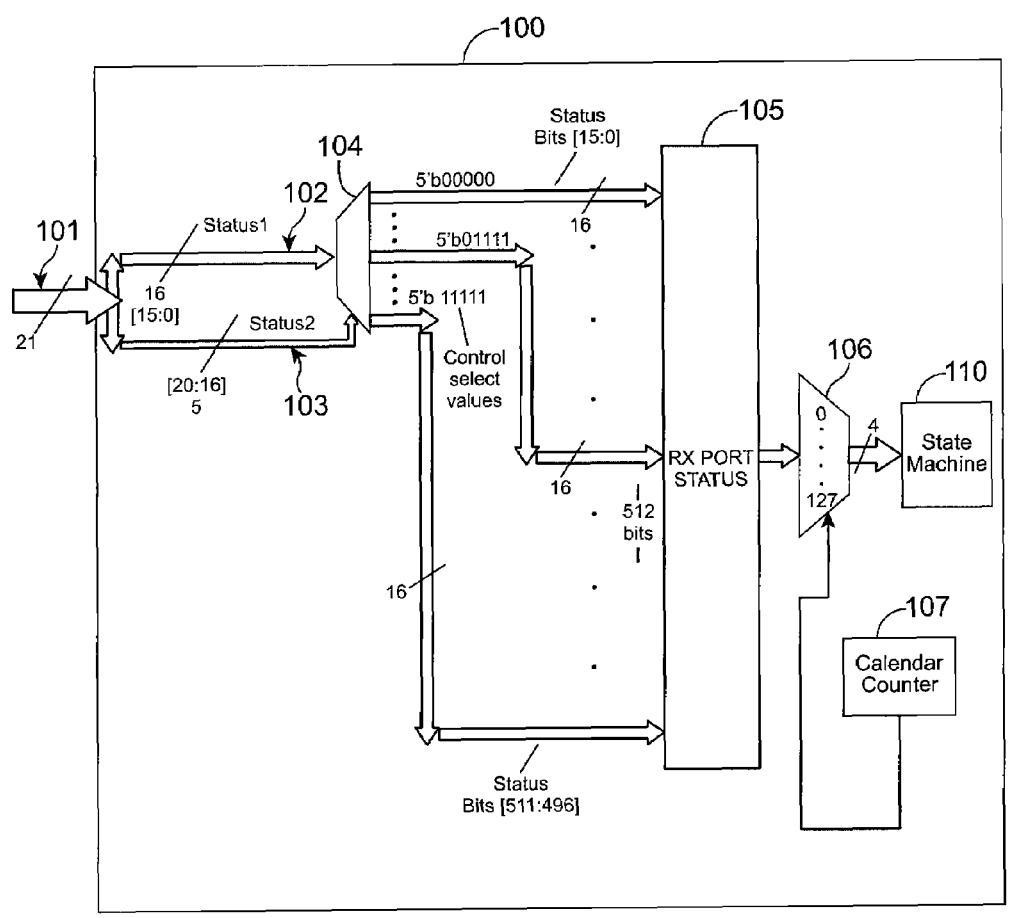
FIG. 1 is a diagram of a portion of a hard intellectual property (HIP) block that receives user FIFO status information bits according to an embodiment of the present invention.

FIG. 1 illustrates an embodiment of the present invention. FIG. 1 illustrates a portion of HIP block 100 that is designed to operate as a SPI4.2 interface. HIP 100 is part of a programmable logic IC. The FIFO status information is sent into the HIP block on bus 101. The status bits are encoded in the previously discussed SPI4.2 status format (hungry, starving, satisfied), which indicates how many additional data bits the receiver ports can handle. The portion of HIP block 100 shown in FIG. 1 is part of a SPI4.2 receiver that is transmitting status bits to an adjacent SPI4.2 transmitter. The HIP block stores the status bits in block 105. The status bits are then sent to state machine 110 to be inserted into the SPI4.2 format status channel calendar sequence.

Referring to FIG. 1, HIP block 100 is coupled to receive 21 parallel input wires on bus 101. Bus 101 contains FIFO status information and an address select. HIP block 100 only requires 21 input ports to receive all of the FIFO status signals that are needed for 256 SPI4.2 ports at the receiver.

The number of wires on bus 101 is described herein as being 21 merely as an example. Also, the number of SPI4.2 receiver ports is described herein as an example. These examples are not intended to limit the scope of the present invention. The present invention includes circuits that have any suitable number of status input ports and any suitable number of SPI4.2 receiver ports. The size of bus 101 is determined as a function of the status throughput (determined by the status channel implementation of full-rate vs. $\frac{1}{8}^{th}$ rate), the HIP internal clock speed, the external clock speed, and the number of receiver ports.

HIP block 100 divides the 21 wires on bus 101 into a first set of 16 signal lines on bus 102 and a second set of 5 signal lines on bus 103. Bus 102 transmits 16 bits [15:0] that represent the FIFO status information for at least 8 SPI4.2 receiver ports (8. Ports*2-bits). Bus 103 transmits 5 control signals [20:16] that correspond the status signals on bus 102 to the groups of SPI4.2 receiver ports.

Demultiplexer 104 has 16 data inputs that are coupled to bus 102, and five select inputs that are coupled to bus 103. In response to the select signals on bus 103, demultiplexer 104 separates the FIFO status signals on bus 102 according to their respective SPI4.2 receiver port groups. Demultiplexer 104 is coupled to 512 output channels that transmit the FIFO status signals to port status block 105. Port status block 105 is a storage block (e.g., a memory block).

Bus 102 transmits 16 status bits per the external HIP clock cycle; this frequency is determined by the de-serialization factor of the SERDES used for the HIP SPI4.2 data bus I/O. For example, in 8:1 mode for a 1 Gbps SPI4.2 system, the HIP clock runs at 500 MHz, and the external user clock that provides status bus 102 runs at 125 MHz. The 16 status bits include 8 sets of 2 status bits that indicate the status of 8 input ports. Therefore, 32 sets of 16 status bits are needed to determine the FIFO status for all 256 SPI4.2 ports (i.e., 32×8=256).

Demultiplexer 104 decodes the control signals received on bus 103. The control signals identify which of the SPI4.2 groups of receiver ports the status signals on bus 102 correspond to. Demultiplexer 104 transmits the status signals on bus 102 to the inputs of port status block 105 in response to the decoded control signals.

Port status block 105 contains 32 sets of 16 storage block locations to store the 512 status bits. The 5 control signals bits [20:16] on bus 103 have $2^{5=32}$ unique states that identify which storage locations in block 105 the current set of 16 status bits will be stored in.

The user has the flexibility to control the processing of status bits in HIP block 100, by controlling the 5 control select bits on bus 103. Thus, the user can generate less than 32 unique states of the bus 103 control signals to store status bits for less than 256 SPI4.2 receiver ports in storage block 105. For example, a user can generate control signals on bus 103 that have 16 unique states to store 256 status bits for 128 SPI4.2 receiver ports in storage block 105. This feature is useful for optimizing the status update time for receivers that have less than 256 SPI4.2 input ports when using a HIP block that is hard-wired to support up to 256 SPI4.2 ports.

Demultiplexer 104 outputs a maximum of 8 groups of FIFO status bits in each status update cycle. Using the control signals, HIP block 100 converts signals on the 21 parallel channels of bus 101 into 512 parallel signals. Thus, the embodiment of FIG. 1 substantially reduces the amount of input ports that a HIP block needs to receive input SPI4.2 status signals (e.g., from 512 to 21 ports).

The status bits that are generated by decoding from demultiplexer 104 are stored within port status block 105. For example, for the current embodiment, a set of 16 status bits received decoded from demultiplexer 104 contain the 2-bit FIFO status values for 8 consecutive slots of port status block 105. The 8 consecutive ports are determined by the 5-bit control signals. A user can store each group set of status bits in storage block 105 in any order. State machine 110 extracts the required status bits that are used as status content for the SPI4.2 status channel from storage block 105, utilizing Calendar counter circuit 107 to control the select input of multiplexer 106.

On a given clock cycle the user may set the control signals on bus 103 to 0, which implies that the 16-bits on bus 102 are the FIFO status values for ports 1 to 8. On the next clock cycle, the user may set the control signal value to "2", implying that the 16-bits will contain the FIFO status values for ports 17 to 24. The control signals on bus 103 determine where the status bits are stored within block 105. The user determines the values of these control signals.

The circuitry of FIG. 1 also minimizes the latency time associated with loading SPI4.2 status bits into HIP block 100. Typically, status bit signals are transmitted on bus 101 at a clock frequency that is much lower than the operating clock frequency of HIP block 100. Programmable logic circuits in the programmable IC cannot be clocked as fast as ASIC logic circuits in HIP block 100, because, in general, programmable logic circuits are subject to longer routing delays.

The present invention accounts for the mismatch between the clock frequencies of HIP block 100 and bus 101 to minimize latency delays in receiving and processing the status bits. An example is now discussed in order to illustrate these techniques. This example is not intended to limit the scope of the present invention. Many other modifications and embodiments are also within the scope of the present invention, including (if applicable) any clock domain crossing methodologies.

Providing an illustrative example, status bits are transmitted on bus 101 at a clock frequency of 125 MHz. The core clock signal of HIP block 100 has a frequency of 500 MHz. The SPI4.2 status channel operates in full-rate mode, implying that the status for each port is transmitted from the HIP block 100 at a rate of 1 Gbps. Both clocks are created from a common source (Typically a PLL in the high speed IO), and are related by the de-serialization factor of the SERDES.

The present invention prevents the FIFO status state machine from enduring latency delays caused by the relatively slow clock speed of the incoming status signals while limiting the amount of HIP I/Os required. The 16 status bits are received at demultiplexer 104 on bus 102 in each cycle of the bus 101 clock signal (e.g., 16-bits*125 Mhz=2 Gbps). Status bits stored in block 105 are output through multiplexer 106 at a maximum rate (when providing status content) of 4 bits in each cycle of the HIP clock signal (e.g., 4-bits*500 Mhz=2 Gbps). Thus, the present invention shows the status rate into HIP block 100 is equal to the rate that the HIP block status channel state machine extracts the bits from block 105 for the status channel content.

Using the illustrative example details from above, calendar counter 107 ensures that 4 status bits are output by the multiplexer in each cycle of the HIP clock frequency when providing status channel content (e.g., not during the Framing, Training, or DIP-2 sequences of the SPI4.2 status channel). Demultiplexer 104 outputs 16 incoming status bits during each cycle of the bus 101 clock signal. After four cycles of the HIP clock signal, multiplexer 106 has output 16 status bits, and demultiplexer 104 has also output 16 status bits, because the HIP clock signal is 4 times faster than the bus 101 clock signal.

Therefore, demultiplexer 104 and multiplexer 106 output the same number of status bits over the same period of time. Status bits can be continually transmitted to the FIFO status state machine 110 without interruption. Using a synchronization pulse output of HIP block 100 (not shown), the user can provide the status to HIP block 100 in such as way that the status is updated 1 HIP clock cycle before status state machine extracts the status from status block 105. This technique substantially reduces the latency time required to transmit status bits to the FIFO state machine at the HIP clock frequency.

In a particular embodiment, calendar counter 107 outputs a sequential sequence of bits that directs the transmission of the status bits through multiplexer 106 to appropriate storage locations in the FIFO status state machine 110. The status bits are stored and processed in FIFO state machine 110 according to the SPI4.2 specifications. The sequential sequence from calendar counter 107 may imply that the status channel is operating in symmetrical calendaring. However, support of other SPI4.2 calendar algorithms (e.g., Asymmetrical calendaring, Hitless Bandwidth Re-provisioning) can be included if the storage locations are treated as calendar slots instead of ports. Alternate calendar types may also be possible.

For a particular embodiment, the maximum calendar length is 256. For example, calendar counter 107 can count from 0 to the calendar length/2 minus 1. For an odd sized calendar length, add 1 to the calendar length in the formula previously described to determine what calendar counter 107 will count up to.

Figure 2:
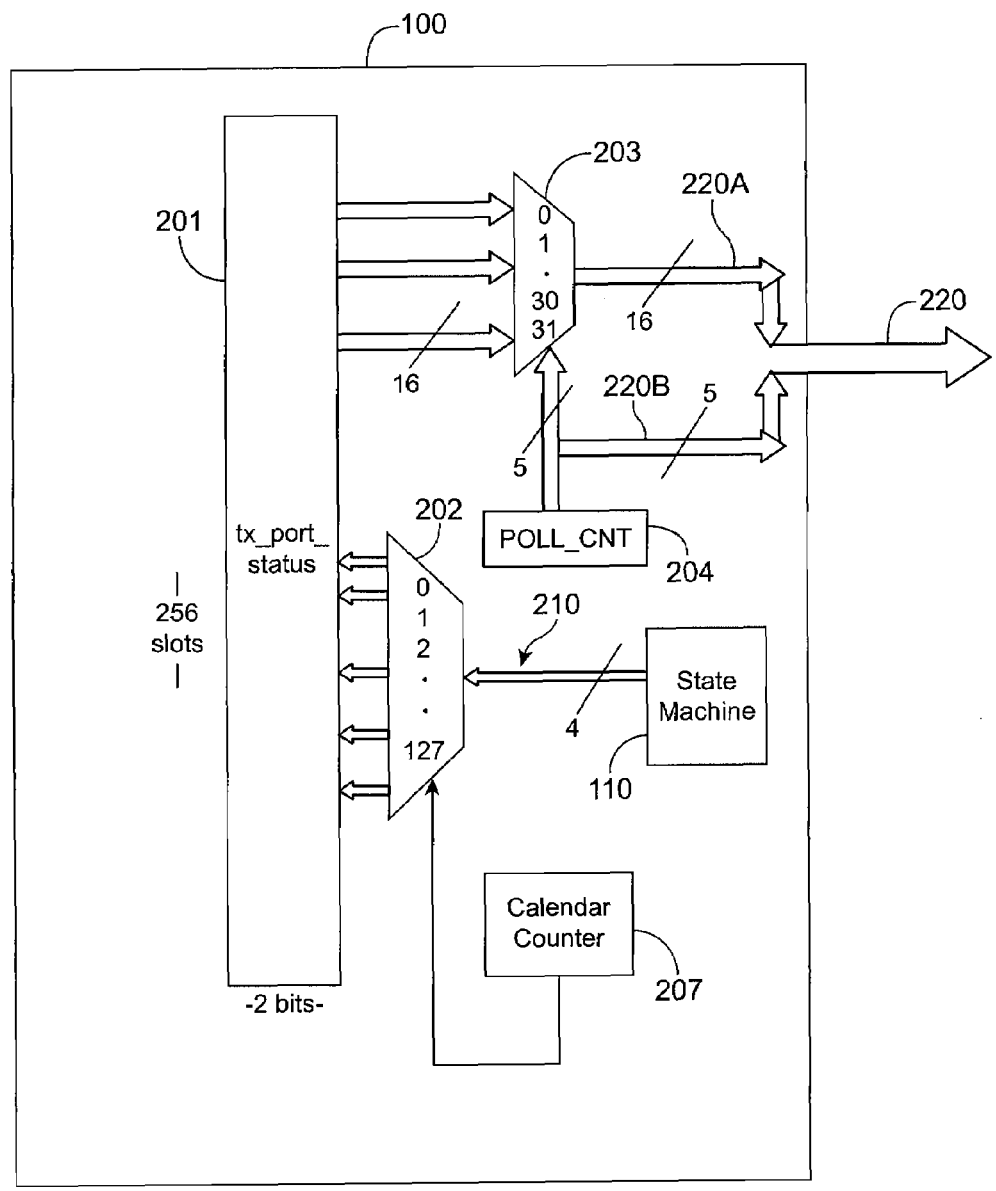
FIG. 2 is a diagram of a portion of a HIP block that transmits FIFO status bits to the user, according to an embodiment of the present invention.

FIG. 2 illustrates a second embodiment of the present invention. Specifically, FIG. 2 illustrates another portion of HIP block 100. According to other embodiments of the present invention, the circuitry shown in FIG. 2 is part of the same HIP block shown in FIG. 1, a separate HIP block on the same IC as the circuitry shown in FIG. 1, or on a different IC.

In the portion of HIP block 100 shown in FIG. 2, HIP block 100 is receiving a SPI4.2 status channel, which is being transmitted from a SPI4.2 data receiver. Once these status bits have been processed and stored, the block transmits the extracted SPI4.2 FIFO status bits out of HIP block 100 to a SPI4.2 scheduler that is transmitting data bits to the HIP block.

FIG. 2 illustrates state machine 110, demultiplexer 202, calendar counter 207, status block 201, multiplexer 203, and poll count generator 204. State machine 110 outputs 4 decoded FIFO status bits at a time from the calendar interface.

The FIFO status bits are transmitted to the inputs of demultiplexer 202 along bus 210. Demultiplexer 202 stores the FIFO status bits for ports/calendar slots 0-255 (but typically referred to as ports 1 to 256) in sequential order in status table 201. Status table 201 is a storage block for storing the FIFO status bits.

Calendar counter 207 outputs address signals that are transmitted to the select inputs of demultiplexer 202. According to an embodiment, the binary value of the address signals are incremented in sequential order starting from an initial value. The address signals identify calendar slots in status table 201 where the FIFO status bits will be stored.

Demultiplexer 202 transmits the FIFO status bits from bus 210, four bits at a time, to storage locations in status table 201 that are identified by the decoded address signals received from calendar counter 207. The four bits contain the FIFO status values for 2 sequential ports/calendar slots. Calendar counter 207 and demultiplexer 202 operate at the frequency of the HIP block clock signal (e.g., 500 MHz).

For a particular embodiment, Status table 201 includes 256 calendar slots. Each calendar slot includes storage space for 2 bits. Thus, status table 201 can store 512 bits for 256 ports/calendar slots according to the 2-bit port status data structure. After demultiplexer 202 has stored the bits for all of the calendar slots in status table 201, calendar counter 207 resets the address signals to the initial value.

Calendar counter 207 then increases the address signals starting from the initial value and ending at a value that represents the calendar length divided by 2 for a particular embodiment. Calendar counter circuit 207 controls the select input of multiplexer 202 when providing status channel content (e.g., not during the Framing, Training, or DIP-2 sequences of the SPI4.2 status channel).

For example, calendar counter 207 can count from 0 to the calendar length/2 minus 1. For an odd sized calendar length, add 1 to the calendar length in the formula previously described to determine what calendar counter 207 will count up to. The sequential sequence from Calendar counter 207 may imply that the status channel is operating in symmetrical calendaring. However, support of other SPI4.2 calendar algorithms (e.g., Asymmetrical calendaring, Hitless Bandwidth Re-provisioning) can be included if the storage locations are treated as calendar slots instead of ports. Alternate calendar types may also be possible.

HIP block 100 also includes poll counter circuit 204. Poll counter 204 is an on-chip circuit block in HIP block 100 that generates five address signals. The 5 address signals control the select inputs of multiplexer 203. The 5 address signals generated by poll counter 204 are also transmitted out of HIP block 100 on bus 220 as shown in FIG. 2.

The signals generated by the poll counter change depending on the relationship between the internal HIP clock and the external user clock. Both clocks are created from a common source (Typically a PLL in the high speed IO), and are related by the de-serialization factor of the SERDES. As an example, for a 1 Gbps SPI4.2 system, an 8:1 de-serialization factor yields a 500 MHz internal HIP clock and 125 MHz external user clock. In this example, the poll count changes its value once every 4 clock cycles (and nominally 1 HIP clock cycle after the clock edge the external flip-flops are registered on).

FIFO status bits are transmitted out of HIP block 100 along output bus 220A. Output bus 220A has 16 parallel signal wires that can transmit 16 status bits at a time. Each set of 16 status bits corresponds to 8 SPI4.2 calendar slots. Bus 220A merges with bus 220B from poll counter 204 to form a 21-bit output bus 220 as shown in FIG. 2.

The number of wires on bus 220 is described herein as being 21 merely as an example. Also, the number of SPI4.2 receiver ports/calendar slots is described herein as an example. These examples are not intended to limit the scope of the present invention. The size of bus 220 is determined as a function of the status throughput (determined by the status channel implementation of full-rate vs. $\frac{1}{8}^{th}$ rate), the HIP internal clock speed, the external clock speed, and the number of receiver calendar slots.

Multiplexer 203 decodes the address signals generated by poll counter 204. Multiplexer 203 then couples output bus 220 to slots in status table 201 that are identified by the decoded address signals.

For example, when the poll counter address signals are 00000, multiplexer couples bus 220 to the slots in status table 201 that correspond to the first 8 SPI4.2 receiver calendar slots (0-7). When the poll counter signals are 00001, multiplexer couples bus 220 to the slots in table 201 that correspond to the next 8 SPI4.2 receiver calendar slots (8-15). The 5 poll counter address signals have $2^5$=32 unique states that are decoded to address 32 sets of the 256 SPI4.2 receiver calendar slots in groups of 8 (32×8=256). 16 status bits are stored in table 201 for each set of 8 calendar slots.

The circuitry of FIG. 2 uses a minimum number of HIP block pins to transmit the FIFO status bits out of HIP block 100 on bus 220. For example, the embodiment of FIG. 2 requires 16 pins coming out of HIP block 100 to accommodate bus 220. The multiplexing techniques of FIG. 2 allow bus 220 to use far less than the 512 output pins to transmit the FIFO status bits out of HIP block 100.

The present invention prevents external user logic from enduring latency delays caused by the relatively slow clock speed of the user logic, while limiting the amount of HIP I/Os required. The 16 status bits on bus 220 effectively toggle at the user logic clock rate (e.g., 16-bits*125 Mhz=2 Gbps). Status bits stored in block 201 are input through multiplexer 202 (when providing status content) at a rate of 4 bits in each cycle of the HIP clock signal (e.g., 4-bits*500 Mhz=2 Gbps). Thus, the present invention shows the status rate out of HIP block 100 is equal to the rate that the HIP block status channel state machine decodes the bits from block 110 for the status channel content.

The SPI4.2 specifications allow a receiver to have less than 256 input data ports. The techniques of the present invention can also be applied to applications that have less than 256 receiver ports. For applications that use less than 256 SPI4.2 receiver ports, poll counter 204 only cycles through addresses that identify the SPI4.2 receiver ports that are actually being used. For example, if the receiver has only 16 SPI4.2 ports, poll counter 204 generates two unique sets of address signals (00000 and 00001) to select slots 0-7 (bits 0-15) and slots 8-15 (bits 16-31). Poll counter 204 does not waste time and resources cycling through addresses in table 201 that are always empty, because they correspond to unused receiver calendar slot ports.

The circuitry of FIG. 2 uses a minimum number of HIP block pins to transmit the FIFO status bits out of HIP block 100 on bus 220. For example, the embodiment of FIG. 2 requires 21 pins coming out of HIP block 100 to accommodate bus 220. The multiplexing techniques of FIG. 2 allow bus 220 to use far less than the 512 output pins to transmit the FIFO status bits out of HIP block 100.

A scheduling algorithm can be used to manipulate SPI4.2 compatible data in reply to the FIFO status information. In general, a scheduling algorithm determines what port to read from and how much data to read from that port. Another advantage of the embodiment of FIG. 2 is that a scheduling algorithm is not hardwired into circuitry within HIP block 100 in the transmitter direction. Instead, a user can configure programmable logic circuits in the programmable IC to implement any desired scheduling algorithm. Because different users apply different scheduling algorithms to the status bits, scheduling has not been added to HIP block 100 to provide a user with this added flexibility.

The current embodiment also easily supports configuring HP block 100 as a SPI4.2 loopback. Output bus 220 can easily be connected to input bus 101 (in FIG. 1) to provide the status loopback required in this application.

Figure 3A:
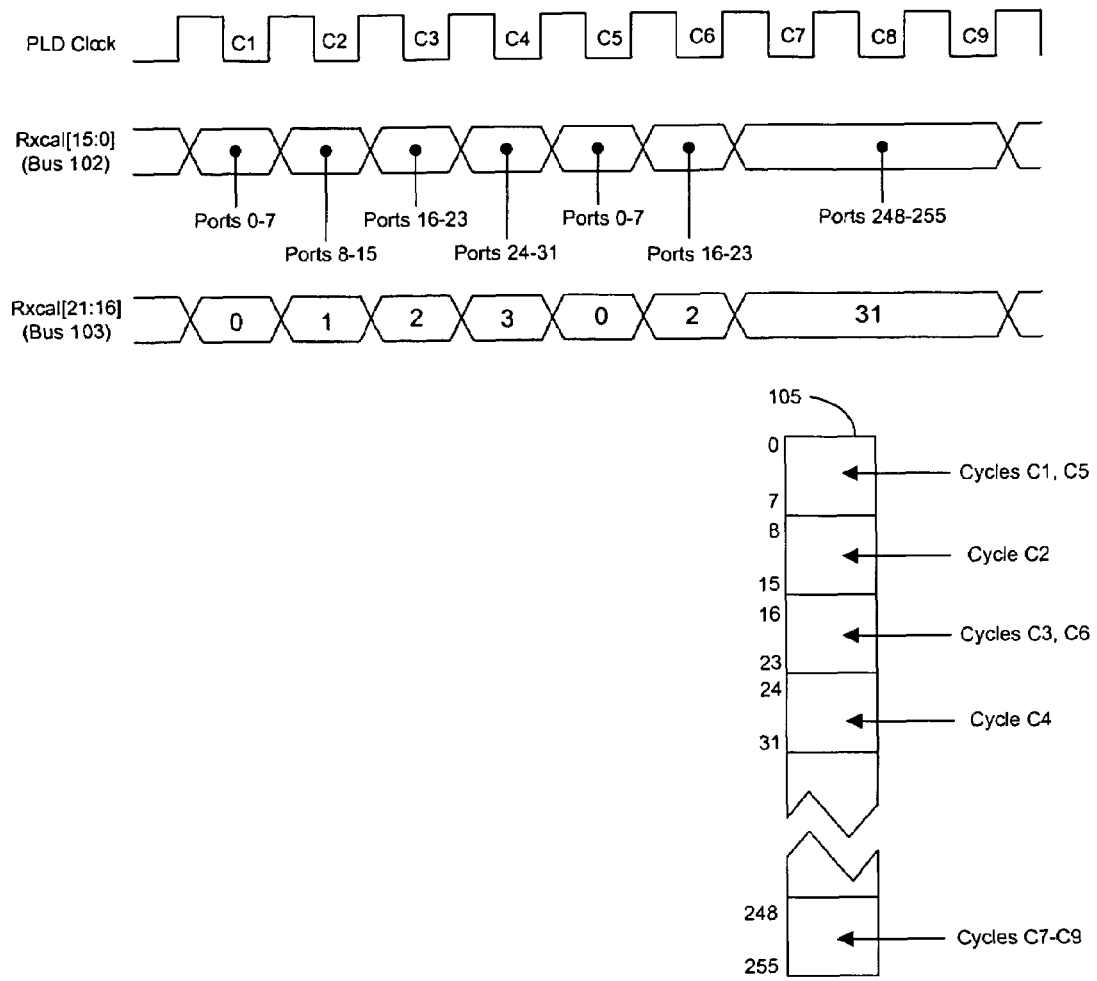
FIGS. 3A-3B are timing diagrams that illustrate the operation of receiver and transmitter embodiments of the present invention.

FIG. 3A is a timing diagram of signals that illustrate the operation of the receiver shown in FIG. 1. The PLD clock signal is the clock signal for the programmable logic portion of the integrated circuit. The Rxca1[15:0] bits are examples of FIFO status signals transmitted on bus 102 to the data inputs of demultiplexer 104. The Rxca1[21:16] bits are examples of control signals transmitted on bus 103 to the select inputs of demultiplexer 104.

FIG. 3A illustrates that a user can load the FIFO status bits into slots within storage block 105 in any order. The FIFO status bits do not have to be loaded into block 105 in sequential order. In the example shown in FIG. 3A, in clock cycle C1, FIFO status bits for ports 0-7 are initially stored in slots 0-7 during clock cycle C1. Subsequently, FIFO status bits for ports 0-7 are again stored in slots 0-7 during clock cycle C5. The second set of FIFO status bits for ports 0-7 replaces the first set. This example illustrates that FIFO status bits can be updated in any order desired by the user.

Additional examples are also illustrated in FIG. 3A. FIFO status bits for ports 8-15 are loaded into slots 8-15 in clock cycle C2. FIFO status bits for ports 16-23 are loaded into slots 16-23 in clock cycles C3, and updated in cycle C6. FIFO status bits for ports 24-31 are loaded into slots 24-31 in clock cycle C4.

FIFO status bits for ports 248-255 are loaded into slots 248-255 in clock cycles C7-C9. This examples illustrates that the Rxca1[21:16] bits can be left constant over several clock cycles to continuously refresh the FIFO status bits stored in selected slots of storage block 105. One advantage of this example is that the status of a single active port can be continuously updated.

Figure 3B:
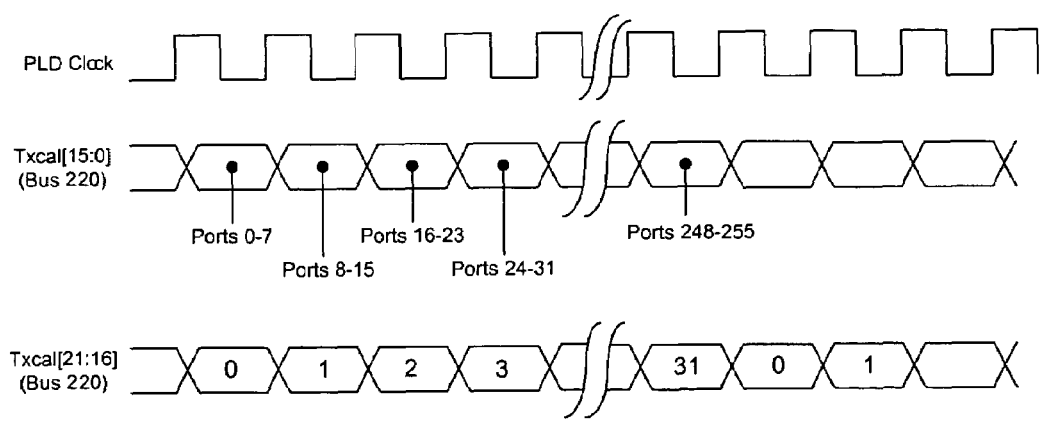

FIG. 3B is a timing diagram of signals that illustrate the operation of the transmitter shown in FIG. 2. The signals shown in FIG. 3B illustrate that the FIFO status signals are continuously transmitted by the receiver as the FIFO status signals are received in the port status table 201. The Txca1 [15:0] bits are examples of FIFO status signals transmitted on bus 220 at the outputs of multiplexer 203. The Txca1[21:16] bits are examples of control signals transmitted on the upper bits of bus 220 from poll counter 204 to the select inputs of multiplexer 203.

Figure 4:
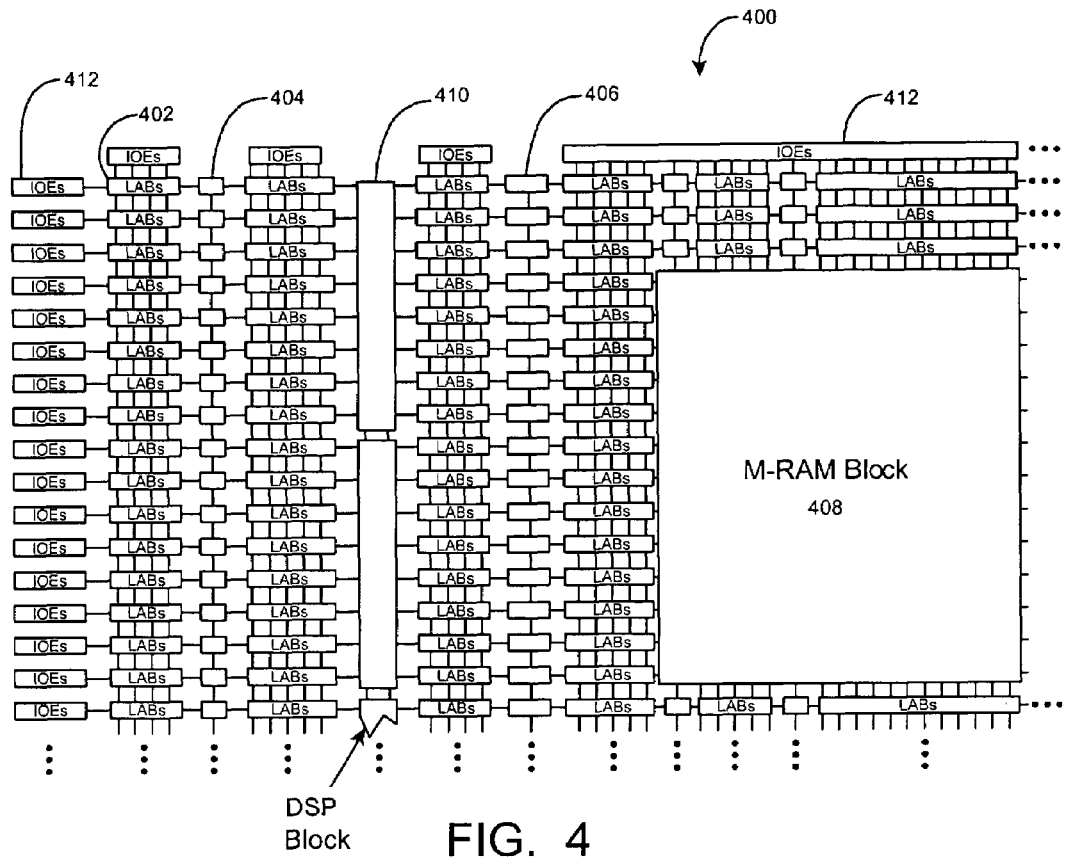
FIG. 4 is a simplified block diagram of a programmable logic device that can be used with the techniques of the present invention.

FIG. 4 is a simplified partial block diagram of one example of PLD 400 that can include aspects of the present invention. Although the present invention is discussed primarily in the context of PLDs and FPGAs, it should be understood that the present invention can be applied to numerous types of programmable integrated circuits. PLD 400 is an example of a programmable integrated circuit in which techniques of the present invention can be implemented. PLD 400 includes a two-dimensional array of programmable logic array blocks (or LABs) 402 that are interconnected by a network of column and row interconnects of varying length and speed. LABs 402 include multiple (e.g., 10) logic elements (or LEs).

An LE is a programmable logic block that provides for efficient implementation of user defined logic functions. PLD has numerous logic elements that can be configured to implement various combinatorial and sequential functions. The logic elements have access to a programmable interconnect structure. The programmable interconnect structure can be programmed to interconnect the logic elements in almost any desired configuration.

PLD 400 also includes a distributed memory structure including RAM blocks of varying sizes provided throughout the array. The RAM blocks include, for example, 512 bit blocks 404, 4K blocks 406 and a memory block 408 providing 512K bits of RAM. These memory blocks can also include shift registers and FIFO buffers.

PLD 400 further includes digital signal processing (DSP) blocks 410 that can implement, for example, multipliers with add or subtract features. I/O elements (IOEs) 412 located, in this example, around the periphery of the device support numerous single-ended and differential I/O standards. It is to be understood that PLD 400 is described herein for illustrative purposes only and that the present invention can be implemented in many different types of PLDs, FPGAs, and the like.

Figure 5:
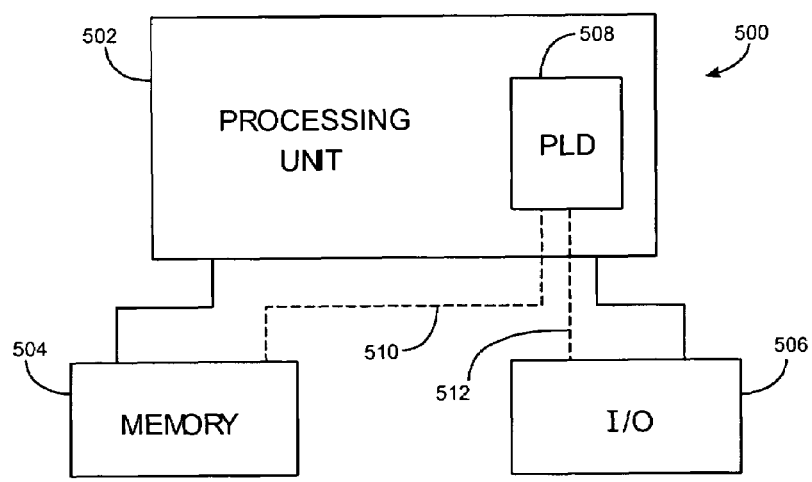
FIG. 5 is a block diagram of an electronic system that can implement embodiments of the present invention.

While PLDs of the type shown in FIG. 4 provide many of the resources required to implement system level solutions, the present invention can also benefit systems wherein a PLD is one of several components. FIG. 5 shows a block diagram of an exemplary digital system 500, within which the present invention can be embodied. System 500 can be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 500 can be provided on a single board, on multiple boards, or within multiple enclosures.

System 500 includes a processing unit 502, a memory unit 504 and an I/O unit 506 interconnected together by one or more buses. According to this exemplary embodiment, a programmable logic device (PLD) 508 is embedded in processing unit 502. PLD 508 can serve many different purposes within the system in FIG. 5. PLD 508 can, for example, be a logical building block of processing unit 502, supporting its internal and external operations. PLD 508 is programmed to implement the logical functions necessary to carry on its particular role in system operation. PLD 508 can be specially coupled to memory 504 through connection 510 and to I/O unit 506 through connection 512.

Processing unit 502 can direct data to an appropriate system component for processing or storage, execute a program stored in memory 504 or receive and transmit data via I/O unit 506, or other similar function. Processing unit 502 can be a central processing unit (CPU), microprocessor, floating point coprocessor, graphics coprocessor, hardware controller, microcontroller, programmable logic device programmed for use as a controller, network controller, and the like. Furthermore, in many embodiments, there is often no need for a CPU.

For example, instead of a CPU, one or more PLDs 508 can control the logical operations of the system. In an embodiment, PLD 508 acts as a reconfigurable processor, which can be reprogrammed as needed to handle a particular computing task. Alternately, programmable logic device 508 can itself include an embedded microprocessor. Memory unit 504 can be a random access memory (RAM), read only memory (ROM), fixed or flexible disk media, PC Card flash disk memory, tape, or any other storage means, or any combination of these storage means.

While the present invention has been described herein with reference to particular embodiments thereof, a latitude of modification, various changes, and substitutions are intended in the present invention. In some instances, features of the invention can be employed without a corresponding use of other features, without departing from the scope of the invention as set forth. Therefore, many modifications may be made to adapt a particular configuration or method disclosed, without departing from the essential scope and spirit of the present invention. It is intended that the invention not be limited to the particular embodiments disclosed, but that the invention will include all embodiments and equivalents falling within the scope of the claims.

What is claimed is:

1. An integrated circuit that receives data in SPI4.2 format, the integrated circuit comprising:
   a programmable logic portion; and
   a hard intellectual property (HIP) block, coupled to the programmable logic portion, comprising,
      a demultiplexer having data inputs coupled to receive FIFO status signals at data inputs and control signals at select inputs; and
      a storage block coupled to receive the FIFO status signals from outputs of the demultiplexer, wherein the demultiplexer stores the FIFO status signals in slots in the storage block, and the demultiplexer selects particular slots in the storage block by decoding the control signals.

2. The integrated circuit defined in claim 1 wherein programmable logic circuits in the programmable logic portion are clocked at a first clock signal frequency, and the HIP block operates at a second clock signal frequency that is greater than the first clock signal frequency.

3. The integrated circuit defined in claim 1 wherein the HIP block further comprises:
   a calendar counter that generates second control signals; and
   a multiplexer having select inputs coupled to receive the second control signals and data inputs coupled to receive the FIFO status signals from the storage block.

4. The integrated circuit defined in claim 3 wherein the HIP block further comprises:
   a FIFO status state machine coupled to receive the FIFO status signals from output terminals of the multiplexer.

5. The integrated circuit defined in claim 1 wherein the storage block has enough space to store at least 512 bits that correspond to 256 ports in the receiver.

6. An integrated circuit that transmits data in SPI4.2 format, the integrated circuit comprising:
- a programmable logic portion; and
- a hard intellectual property (HIP) block, coupled to the programmable logic portion, comprising,
  - a demultiplexer having data inputs coupled to receive FIFO status bits from a FIFO status state machine,
  - a calendar counter coupled to select inputs of the demultiplexer,
  - a storage block that stores the FIFO status bits received from the demultiplexer, and
  - a multiplexer coupled between the storage block and outputs of the HIP block that outputs the FIFO status bits.

7. The integrated circuit according to claim 6 wherein the calendar counter generates first select signals that control which of the output terminals of the demultiplexer are coupled to the data input terminals of the demultiplexer in each clock cycle.

8. The integrated circuit according to claim 7 wherein the HIP block further comprises:
- a poll counter generating second select signals that control which data inputs of the multiplexer are coupled to outputs of the multiplexer in each clock cycle.

9. The integrated circuit according to claim 8 wherein the poll counter and the calendar counter cause the multiplexer and the demultiplexer, respectively, to output the FIFO status bits at an HIP clock frequency, the HIP clock frequency being greater than a frequency of a clock signal used to clock programmable logic circuits in the programmable logic portion.

10. A method for storing FIFO status signals received at a programmable logic integrated circuit, the method comprising:
- receiving the FIFO status signals on a first bus and control signals on a second bus in a hard intellectual property (HIP) block on the programmable logic integrated circuit;
- transmitting the FIFO status signals to a subset of input terminals of a storage block using a third bus, wherein the input terminals are selected in response to decoding the control signals; and
- storing the FIFO status signals corresponding to each port of the receiver in storage locations in the storage block.

11. The method defined in claim 10 wherein the storage block has enough unique storage locations to store 512 FIFO status bits that correspond to 256 SPI4.2 compatible data input ports of the receiver.

12. The method defined in claim 11 wherein receiving the FIFO status signals and the control signals on the HIP block further comprises receiving the FIFO status signals at data inputs of a demultiplexer and receiving the control signals at select inputs of the demultiplexer, wherein the demultiplexer receives a subset of the FIFO status signals in each clock cycle, the subset of the FIFO status signals corresponding to a subset of the 256 data input ports of the receiver.

13. The method defined in claim 10 further comprising:
- transmitting the FIFO status signals to a FIFO status state machine using a multiplexer coupled to the storage block.

14. The method defined in claim 13 further comprising:
- generating select signals using a calendar counter, wherein the multiplexer selects subsets of the FIFO status signals in response to the select signals.

15. A method for transmitting FIFO status signals from a hard intellectual property (HIP) block on a programmable logic integrated circuit, the method comprising:
- demultiplexing the FIFO status signals received from a FIFO status state machine using a demultiplexer;
- storing the demultiplexed FIFO status signals in a storage block; and
- transmitting the FIFO status signals from the storage block outside the HIP block using a multiplexer.

16. The method according to claim 15 wherein the multiplexer transmits a subset of the FIFO status signals stored in the storage block outside the HIP block in each cycle of a clock signal.

17. The method according to claim 16 further comprising:
- generating first control signals using a calendar counter, wherein the demultiplexer transfers subsets of the FIFO status signals to the storage block in response to the first control signals.

18. The method according to claim 17 further comprising:
- generating second control signals using a poll counter, wherein the multiplexer transfers subsets of the FIFO status signals from the storage block outside the HIP block in response to the second control signals.

19. The method according to claim 18 wherein the poll counter and the calendar counter generate the first and the second control signals, respectively, at a first frequency that is greater than a second frequency of a clock signal used to clock programmable logic circuits in the integrated circuit.

20. The method according to claim 15 wherein the storage block has enough memory space to store 512 FIFO status bits.

* * * * *